A. G. M. MICHELL.
FILM LUBRICATED THRUST BEARING.
APPLICATION FILED JAN. 3, 1913.
1,196,573. Patented Aug. 29, 1916.
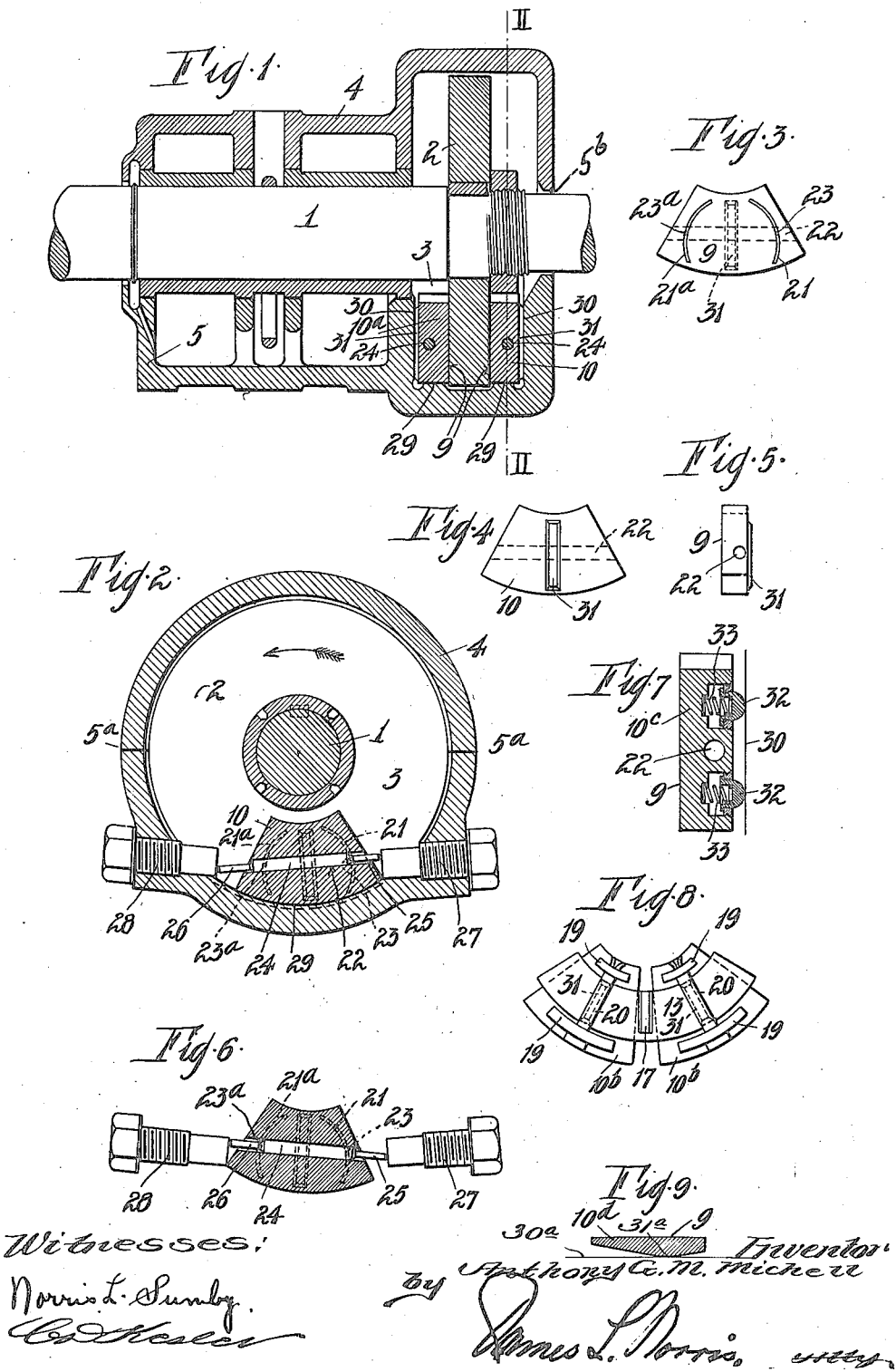

UNITED STATES PATENT OFFICE.

ANTHONY GEORGE MALDON MICHELL, OF MELBOURNE, VICTORIA, AUSTRALIA.

FILM-LUBRICATED THRUST-BEARING.

1,196,573.   Specification of Letters Patent.   Patented Aug. 29, 1916.

Application filed January 3, 1913. Serial No. 740,041.

*To all whom it may concern:*

Be it known that I, ANTHONY GEORGE MALDON MICHELL, a subject of the King of Great Britain, residing at No. 450 Collins street, Melbourne, in the State of Victoria, Commonwealth of Australia, have invented a Film-Lubricated Thrust-Bearing, of which the following is a specification.

This invention relates to thrust bearings of the type designed to maintain automatically films of fluid lubricant between the opposed bearing surfaces.

In the construction of thrust bearings hitherto it has been usual to provide on both the stationary and the moving parts, between which the thrust-pressure is exerted, bearing surfaces extending circumferentially around the shaft. In the older types of such bearings both such surfaces were either continuous rings, or if one such surface were formed as an incomplete or interrupted ring for constructional or other reasons, as in marine thrust bearings, it was, nevertheless, extended around as much as practicable of the circumference of the other ring, with a view to increasing the bearing surface and decreasing the intensity of pressure as much as possible with the space available. In a newer form, of which the first publication was made in my prior British Patent, No. 875/05, only one of such surfaces is continuous, the opposed surface being formed in segments on a number of separate elements which are each pivoted or flexibly supported so as to be capable of tilting slightly about a substantially radial line. Elements supported in this manner are hereinafter referred to as pivoted elements or pivoted blocks. In this form, also, however, such elements have hitherto been arranged in a series so as to form a substantially complete annular bearing surface surrounding the shaft.

Owing to the formation, in the case of pivotally supported elements, of fluid films which prevent contact between the solid parts, it is possible with them to carry more intense pressures than with the older form of thrust bearings, and I have found that improved results are obtained when the pressures are intensified by restricting the bearing surface to a few relatively small segmental elements, suitably arranged for effective lubrication, rather than by forming a complete or nearly complete annulus of bearing surface, and it is on the discovery of this fact that the present invention is based. In the application of the invention, such elements, hereinafter called blocks, are preferably arranged in the case of horizontal or inclined shafts, to which the invention particularly relates, on the lower side of the shaft and located in an oil well constructed in the lower portion of the fixed case of the bearing. A single block or a group of blocks as hereinafter described may be used according to the pressure required to be carried. Blocks thus located are better adapted to obtain a proper supply of lubricant and for convenient assemblage and removal than are bearings of the peripheral-ring form.

In the accompanying drawings: Figure 1 is a vertical section through the axis of a bearing constructed according to the invention and designed for thrust in either direction and for both forward and reverse rotation. Fig. 2 is a transverse section on line II—II of Fig. 1. Figs. 3, 4 and 5 are respectively front, back and side views of a bearing element or block. Fig. 6 shows the bearing block of Fig. 2 in the position for reverse rotation. Fig. 7 shows an alternative construction of a bearing block. Fig. 8 is a back view of a pair of bearing blocks and connecting pieces. Fig. 9 is a section of a bearing block designed for rotation in one direction only.

In the bearing shown in Figs. 1 and 2, the shaft 1 is fitted with a thrust collar 2 running in oil-chamber 3, which may be combined with a journal bearing 5 carrying the shaft. The chamber 3, as well as the journal bearing, may be formed with a horizontal joint 5$^a$ dividing the cap portion 4, from the lower portion, as is usual in journal bearings, an opening being arranged in the side of such chamber, to admit the shaft 1, with an annular clearance 5$^b$. In the lower portion of the chamber 3, the blocks 10 and 10$^a$ are arranged, one on each side of the collar 2, which has a plane face on each side, one block or the other being in operation according to the direction of the thrust exerted. As explained hereinafter the blocks 10 and 10$^a$ may each be replaced by a pair or group of blocks with means for distributing the thrust between them.

To provide the theoretical conditions requisite for maintaining wedge-shaped films of oil between the blocks and the collar 2, with either direction of rotation, the inner or working face 9 of each block has two grooves 21 and 21$^a$ formed therein, which are preferably curved, as shown in Fig. 3, while the outer face of each block is provided with a radial strip or rib 31, Fig. 4, which has a pivotal engagement with the fixed part of the bearing. As shown in Figs. 3 and 4, the grooves 21 and 21$^a$ are situated toward the ends of the working surface 9, while the bearing strip 31 is situated at the middle of the length of the block.

A hole 22 is drilled longitudinally through the block communicating with each of the grooves 21 and 21$^a$ by the ports 23 and 23$^a$, and is fitted with a longitudinally sliding valve 24, in the form of a spindle which is reduced in diameter at its ends 25—26. The central portion of the valve, is a substantially fluid-tight fit in the hole 22, being of barely sufficient length to reach from port to port when in its central position. The ends 25—26 of the valve abut on stops, such as screws 27—28, with sufficient longitudinal clearance to allow of the movement hereinafter described. The blocks 10 and 10$^a$ may rest on strips 29 formed on the bottom of the oil-chamber 3, and the sides of this oil-chamber are formed with plane faces 30 adapted to support the radial bearing strips 31 of the blocks 10 and 10$^a$. A slight clearance is allowed in the total width between the two bearing surfaces 30 in excess of the total thickness of the two blocks and the collar 2, in order to allow of the formation of the desired wedge-shaped films of lubricant.

The operation of the blocks is as follows: The collar 2 being assumed to rotate in the direction of the arrow (Fig. 2) and to exert a thrust toward the right, (Fig. 1) and consequently a pressure upon the block 10, this block will be carried by the friction on its working surface toward the right (Fig. 2) until it is stopped by its edge coming in contact with the screw 27 as shown. When in this position the right hand port 23 will be opposite to the end 25 of the spindle valve 24 and will be in communication with the oil chamber 3 while the left hand port 23$^a$ will be opposite the larger portion of the spindle valve 24 and will consequently be closed. In consequence of this position of the valve 24 with respect to the ports the pressure in the right hand groove 21 will be the same as in the oil chamber 3 and the portion of the bearing surface of the block between this groove and the right hand end of the block will be practically incapable of maintaining any pressure in the oil film or of carrying any load. On the other hand, the left hand end of the block will not have any communication through its groove 21$^a$ and port 23$^a$, with the oil chamber 3 and will permit of a pressure being generated in the film of oil on the working surfaces by the rotation of the collar 2. The block 10 being thus unsymmetrically loaded will tilt so as to make the thickness of the oil greater at its left-hand than at its right-hand end as required for the maintenance of the fluid pressure. When the thrust collar 2 rotates in the opposite direction, the thrust still being in the direction toward the right, (Fig. 1), the block 10 will be carried around by the friction into the position shown in Fig. 6, the spindle valve 24 also rotating but being prevented from moving longitudinally with the block 10 by the screws 27 and 28 as already mentioned. The left hand port 23$^a$ will now be uncovered and the right hand port 23 covered by the larger portion of the spindle valve 24 and the block will tilt about its bearing strip 31 so as to make the thickness of the oil-film greatest at the right hand end, as required by the new direction of rotation. While the thrust is in the direction assumed above, i. e. toward the right in Fig. 1 the block on the other or distant side of the collar 2 carries no thrust and is practically inoperative. When the thrust of the shaft is in the opposite direction, i. e. toward the left in Fig. 1, the block 10$^a$, i. e., that on the left-hand side of the collar 2, operates in exactly the same way as the right-hand block 10 in the case described above, and said right-hand block becomes inoperative.

The particular form of valve and mode of support of the blocks above described are given by way of example only, and may be varied, the essential feature being the mode of varying the extent and position of the portion of the working surface capable of maintaining an effective pressure in the lubricant by means of an automatically operated valve.

In cases when it is not convenient to provide a single bearing block of sufficient size to carry the thrust exerted by the shaft, the blocks 10 and 10$^a$ shown in Figs. 1 to 6 may each be replaced by a pair of blocks as shown in Fig. 8. Such blocks 10$^b$, 10$^b$ are each furnished with a bearing strip 31, as above described, by means of which they are pivotally supported on a bar 13, and may be retained in position on such bar by lugs 19, and pins 20. The bar 13, which may be of segmental shape as shown, is furnished with a bearing strip 17, which is adapted to pivotally support the bar on the case of the bearing. The thrust on the blocks is thus transmitted through their bearing strips 31 to the bar 13, and from the latter through the strip 17 to the casing and the thrust is equalized between the blocks 10$^b$ by the bar 13 acting as a balance beam fulcrumed on the strip 17.

If it is desired to use more than two blocks they may be fitted, in place of the rigid bearing strips 31, with separate studs 32 as shown in Fig. 7, a spring 33 being interposed between the stud 32 and the block 10$^c$. By means of the studs 32 the blocks are each pivotally supported on the casing as already explained in connection with Figs. 1 to 5, and further since the springs 33 are made of equal strength in each block they will yield equally so as to divide the load equally between the blocks.

The use of springs in blocks for thrust-bearings is not novel, and is herein described only as a known means of distributing the thrust, which may be applied to carry out the present invention.

It is not essential to the invention that the pivoted blocks should be provided with valves, such as the valves 24 described above, for producing the unsymmetrical distribution of the fluid pressure on their faces in the manner explained. Under certain conditions bearing blocks symmetrically supported are capable of maintaining effective film-lubrication without special means for modifying the distribution of fluid pressure according to the direction of rotation, and such simplified bearing block may be employed where the greatest simplicity of construction is desired, as for instance as illustrated in Fig. 8.

When the direction of rotation of a thrust collar is invariable, a special form of block adapted to that direction of rotation only may be employed in carrying out the present invention. Such a block is shown in Fig. 9 in tangential section, the line 30ª representing a trace of the plane bearing surface 30. The block 10ᵈ is formed of varying thickness so as to present a bearing strip 31ª adapted to rest on the bearing surface 30ª, such bearing strip 31ª being unsymmetrically placed toward the right-hand end of the figure, the direction of movement of the bearing collar being assumed to be from left to right over the working surface 9. Under these conditions the block 10ᵈ will tilt slightly so as to form a wedge shaped film of oil slightly thicker at the left-hand than at the right-hand end of the bearing surface 9, and thus adapted to support the pressure of the collar. Unsymmetrical bearing blocks, of the type described in connection with Fig. 9, may be employed instead of bearing blocks of the type shown in the other figures of the drawing.

I claim:—

1. A thrust bearing for a horizontal or inclined shaft comprising, in combination, a rotating collar mounted on said shaft, a fixed casing in which is formed an oil chamber on the lower side of said shaft, and a segmental pivoted bearing element arranged in said oil chamber wholly below the level of the lower side of said shaft and adapted to support the thrust of said collar.

2. A thrust bearing for a horizontal or inclined shaft comprising, in combination, a rotating collar mounted on said shaft, a fixed casing in which is formed an oil chamber on the lower side of said shaft, a segmental pivoted bearing element arranged in said oil chamber wholly below the level of the lower side of said shaft and transmitting the thrust from said collar to said casing, and means for preventing circumferential movement of said bearing element.

3. The combination with a horizontal or inclined shaft, of a thrust bearing therefor comprising a collar fixed to said shaft, a casing surrounding said collar and forming an oil chamber below the shaft, pivotally mounted bearing means arranged within said oil chamber and adapted to sustain the thrust of said collar, and means for controlling the escape of oil from the operative face of said bearing means.

4. The combination with a horizontal or inclined shaft, of a thrust bearing comprising a collar fixed to said shaft, a casing having a chamber forming an oil reservoir on the lower side of said shaft, a pivotally mounted bearing element arranged in the oil reservoir between said collar and the adjacent wall of said casing and adapted to sustain the thrust of said collar, and means controlled automatically according to the direction of rotation of said shaft for permitting the escape of oil from the operative face of said bearing element toward one or the other end thereof.

5. In a thrust bearing for a horizontal or inclined shaft, the combination, with a thrust collar adapted to be mounted on the shaft, of a pivoted thrust block on which said collar bears formed with ports, and with grooves on its working face communicating with said ports, and a valve adapted to automatically close one or the other of said ports according to the direction of motion of said collar.

6. In a thrust bearing for a horizontal or inclined shaft, the combination, with a rotating thrust collar adapted to be mounted on the shaft, of a pivoted thrust block coacting with said collar and provided with ports, means for limiting the circumferential movement of said block, and a valve in said block adapted to open or close said ports according to the direction of such circumferential movement, to adapt said block to either direction of motion of said collar.

In testimony whereof I have hereunto set my hand in presence of two subscribing witnesses.

ANTHONY GEORGE MALDON MICHELL.

Witnesses:
   EDWARD N. WATERS,
   WILLIAM H. WATERS.